United States Patent
Deykoon et al.

(10) Patent No.: US 7,388,983 B2
(45) Date of Patent: Jun. 17, 2008

(54) METHOD OF AND SYSTEM FOR DETECTING ANOMALIES IN PROJECTION IMAGES GENERATED BY COMPUTED TOMOGRAPHY SCANNERS

(75) Inventors: Anton Deykoon, Malden, MA (US); Zhengrong Ying, Wakefield, MA (US); Carl R. Crawford, Brookline, MA (US)

(73) Assignee: Analogic Corporation, Peabody, MA (US)

( * ) Notice: Subject to any disclaimer, the term of this patent is extended or adjusted under 35 U.S.C. 154(b) by 651 days.

(21) Appl. No.: 10/920,635

(22) Filed: Aug. 18, 2004

(65) Prior Publication Data

US 2006/0039599 A1 Feb. 23, 2006

(51) Int. Cl.
*G06K 9/00* (2006.01)
*H05G 1/60* (2006.01)
*A61B 6/00* (2006.01)

(52) U.S. Cl. .......................... 382/154; 378/4
(58) Field of Classification Search ............... 382/154; 378/4, 57, 15
See application file for complete search history.

(56) References Cited

U.S. PATENT DOCUMENTS

| | | | |
|---|---|---|---|
| 4,759,047 A | 7/1988 | Donges et al. ............ 378/57 |
| 4,884,289 A | 11/1989 | Glockmann et al. ........ 378/57 |
| 5,132,998 A | 7/1992 | Tsutsui et al. ............ 378/98.9 |
| 5,182,764 A | 1/1993 | Peschmann et al. ........ 378/57 |
| 5,247,561 A | 9/1993 | Kotowski .................. 378/87 |
| 5,319,547 A | 6/1994 | Krug et al. ................ 705/13 |
| 5,367,552 A | 11/1994 | Peschmann ................ 378/57 |
| 5,490,218 A | 2/1996 | Krug et al. ................ 382/100 |
| 5,796,802 A | 8/1998 | Gordon .................... 378/8 |
| 5,802,134 A | 9/1998 | Larson et al. .............. 378/4 |
| 5,881,122 A | 3/1999 | Ruth et al. ................ 378/4 |
| 5,887,047 A | 3/1999 | Ruth et al. ................ 378/4 |
| 5,901,198 A | 5/1999 | Ruth et al. ................ 378/4 |
| 5,909,477 A | 6/1999 | Ruth et al. ................ 378/4 |
| 5,932,874 A | 8/1999 | Legg et al. ............ 250/231.13 |
| 5,937,028 A | 8/1999 | Tybinkowski et al. ...... 378/203 |
| 5,949,842 A * | 9/1999 | Schafer et al. ............ 378/4 |
| 5,970,113 A | 10/1999 | Ruth et al. ................ 378/19 |
| 5,982,843 A | 11/1999 | Bailey et al. .............. 378/4 |
| 5,982,844 A | 11/1999 | Tybinkowski et al. ...... 378/4 |
| 6,026,143 A | 2/2000 | Simanovsky et al. ...... 435/7.1 |
| 6,026,171 A | 2/2000 | Hiraoglu et al. .......... 382/100 |
| 6,035,014 A | 3/2000 | Hiraoglu et al. .......... 378/57 |
| 6,067,366 A | 5/2000 | Simanovsky et al. ...... 382/100 |
| 6,075,871 A | 6/2000 | Simanovsky et al. ...... 382/100 |
| 6,076,400 A | 6/2000 | Bechwati et al. ......... 73/433 |

(Continued)

FOREIGN PATENT DOCUMENTS

DE 3150306 12/1981

*Primary Examiner*—Jingge Wu
*Assistant Examiner*—Amara Abdi
(74) *Attorney, Agent, or Firm*—McDermott Will & Emery LLP

(57) ABSTRACT

A method of and a system for detecting anomalies in projection images generated by CT scanners are provided. One type of anomaly of particular interest is bright or/and dark dots in projection images, which correspond to streak artifacts in the CT images. The method for detecting such bright or/and dark dots in projection images comprises: generating projection images; computing a CFAR distance map; computing a preliminary dot map; generating dot histograms; and detecting bright dots or/and dark dots based on the generated histograms.

2 Claims, 5 Drawing Sheets

U.S. PATENT DOCUMENTS

| | | |
|---|---|---|
| 6,078,642 A | 6/2000 | Simanovsky et al. .......... 378/57 |
| 6,091,795 A | 7/2000 | Schafer et al. ................. 378/19 |
| 6,108,396 A | 8/2000 | Bechwati et al. .............. 378/4 |
| 6,111,974 A | 8/2000 | Hiraoglu et al. ............. 382/100 |
| 6,128,365 A | 10/2000 | Bechwati et al. .............. 378/57 |
| 6,195,444 B1 | 2/2001 | Simanovsky et al. ....... 382/100 |
| 6,256,404 B1 | 7/2001 | Gordon et al. .............. 382/131 |
| 6,272,230 B1 | 8/2001 | Hiraoglu et al. ............ 382/100 |
| 6,345,113 B1 | 2/2002 | Crawford et al. ............ 382/131 |
| 6,687,326 B1 | 2/2004 | Bechwati et al. ............... 378/7 |
| 6,721,387 B1 | 4/2004 | Naidu et al. .................... 378/8 |
| 6,813,374 B1 * | 11/2004 | Karimi et al. .............. 382/131 |
| 7,009,644 B1 * | 3/2006 | Sanchez et al. ............. 348/247 |
| 2003/0004405 A1 * | 1/2003 | Townsend et al. .......... 600/407 |

* cited by examiner

METHOD OF AND SYSTEM FOR DETECTING ANOMALIES IN PROJECTION IMAGES GENERATED BY COMPUTED TOMOGRAPHY SCANNERS

RELATED APPLICATIONS

This patent application and/or patents are related to the following co-pending U.S. applications and/or issued U.S. patents, of the assignee as the present application, the contents of which are incorporated herein in their entirety by reference:

"Multiple angle pre-screening tomographic systems and methods," invented by Bernard M. Gordon, U.S. application Ser. No. 908286, filed on Aug. 7, 1997, now U.S. Pat. No. 5,796,802, issued on Aug. 18, 1998;

"Nutating Slice CT Image Reconstruction Apparatus and Method," invented by Gregory L. Larson, et al., U.S. application Ser. No. 08/831,558, filed on Apr. 9, 1997, now U.S. Pat. No. 5,802,134, issued on Sep. 1, 1998;

"Parallel Processing Architecture for Computed Tomography Scanning System using Non-Parallel Slices," invented by Eric M. Bailey, et al., U.S. application Ser. No. 948697, filed on Oct. 10, 1997, now U.S. Pat. No. 5,887,047, issued on Mar. 23, 1999;

"Computed Tomography Scanner Drive System and Bearing," invented by Andrew P. Tybinkowski, et al., U.S. application Ser. No. 08/948,930, filed on Oct. 10, 1997, now U.S. Pat. No. 5,982,844, issued on Nov. 9, 1999;

"Air Calibration Scan for Computed Tomography Scanner with Obstructing Objects," invented by David A. Schafer, et al., U.S. application Ser. No. 08/948,937, filed on Oct. 10, 1997, now U.S. Pat. No. 5,949,842, issued on Sep. 7, 1999;

"Computed Tomography Scanning Apparatus and Method With Temperature Compensation for Dark Current Offsets," invented by Christopher C. Ruth, et al., U.S. application Ser. No. 08/948,928, filed on Oct. 10, 1997, now U.S. Pat. No. 5,970,113, issued on Oct. 19, 1999;

"Computed Tomography Scanning Target Detection Using Non-Parallel Slices," invented by Christopher C. Ruth, et al., U.S. application Ser. No. 08/948,491, filed on Oct. 10, 1997, now U.S. Pat. No. 5,909,477, issued on Jun. 1, 1999;

"Computed Tomography Scanning Target Detection Using Target Surface Normals," invented by Christopher C. Ruth, et al., U.S. application Ser. No. 08/948,929, filed on Oct. 10, 1997, now U.S. Pat. No. 5,901,198, issued on May 4, 1999;

"Parallel Processing Architecture for Computed Tomography Scanning System Using Non-Parallel Slices," invented by Christopher C. Ruth, et al., U.S. application Ser. No. 08/948,697, filed on Oct. 10, 1997, U.S. Pat. No. 5,887,047, issued on Mar. 23, 1999;

"Computed Tomography Scanning Apparatus and Method For Generating Parallel Projections Using Non-Parallel Slice Data," invented by Christopher C. Ruth, et al., U.S. application Ser. No. 08/948,492, filed on Oct. 10, 1997, now U.S. Pat. No. 5,881,122, issued on Mar. 9, 1999;

"Computed Tomography Scanning Apparatus and Method Using Adaptive Reconstruction Window," invented by Bernard M. Gordon, et al., U.S. application Ser. No. 08/949,127, filed on Oct. 10, 1997, now U.S. Pat. No. 6,256,404, issued on Jul. 3, 2001;

"Area Detector Array for Computed Tomography Scanning System," invented by David A Schafer, et al., U.S. application Ser. No. 08/948,450, filed on Oct. 10, 1997, now U.S. Pat. No. 6,091,795, issued on Jul. 18, 2000;

"Closed Loop Air Conditioning System for a Computed Tomography Scanner," invented by Eric Bailey, et al., U.S. application Ser. No. 08/948,692, filed on Oct. 10, 1997, now U.S. Pat. No. 5,982,843, issued on Nov. 9, 1999;

"Measurement and Control System for Controlling System Functions as a Function of Rotational Parameters of a Rotating Device," invented by Geoffrey A. Legg, et al., U.S. application Ser. No. 08/948,493, filed on Oct. 10, 1997, now U.S. Pat. No. 5,932,874, issued on Aug. 3, 1999;

"Rotary Energy Shield for Computed Tomography Scanner," invented by Andrew P. Tybinkowski, et al., U.S. application Ser. No. 08/948,698, filed on Oct. 10, 1997, now U.S. Pat. No. 5,937,028, issued on Aug. 10, 1999;

"Apparatus and Method for Detecting Sheet Objects in Computed Tomography Data," invented by Muzaffer Hiraoglu, et al., U.S. application Ser. No. 09/022,189, filed on Feb. 11, 1998, now U.S. Pat. No. 6,111,974, issued on Aug. 29, 2000;

"Apparatus and Method for Eroding Objects in Computed Tomography Data," invented by Sergey Simanovsky, et al., U.S. application Ser. No. 09/021,781, filed on Feb. 11, 1998, now U.S. Pat. No. 6,075,871, issued on Jun. 13, 2000;

"Apparatus and Method for Combining Related Objects in Computed Tomography Data," invented by Ibrahim M. Bechwati, et al., U.S. application Ser. No. 09/022,060, filed on Feb. 11, 1998, now U.S. Pat. No. 6,128,365, issued on Oct. 3, 2000;

"Apparatus and Method for Detecting Sheet Objects in Computed Tomography Data," invented by Sergey Simanovsky, et al., U.S. application Ser. No. 09/022,165, filed on Feb. 11, 1998, now U.S. Pat. No. 6,025,143, issued on Feb. 15, 2000;

"Apparatus and Method for Classifying Objects in Computed Tomography Data Using Density Dependent Mass Thresholds," invented by Ibrahim M. Bechwati, et al., U.S. application Ser. No. 09/021,782, filed on Feb. 11, 1998, now U.S. Pat. No. 6,076,400, issued on Jun. 20, 2000;

"Apparatus and Method for Correcting Object Density in Computed Tomography Data," invented by Ibrahim M. Bechwati, et al., U.S. application Ser. No. 09/022,354, filed on Feb. 11, 1998, now U.S. Pat. No. 6,108,396, issued on Aug. 22, 2000;

"Apparatus and Method for Density Discrimination of Objects in Computed Tomography Data Using Multiple Density Ranges," invented by Sergey Simanovsky, et al., U.S. application Ser. No. 09/021,889, filed on Feb. 11, 1998, now U.S. Pat. No. 6,078,642, issued on Jun. 20, 2000;

"Apparatus and Method for Detection of Liquids in Computed Tomography Data," invented by Muzaffer Hiraoglu, et al., U.S. application Ser. No. 09/022,064, filed on Feb. 11, 1998, now U.S. Pat. No. 6,026,171, issued on Feb. 15, 2000;

"Apparatus and Method for Optimizing Detection of Objects in Computed Tomography Data," invented by Muzaffer Hiraoglu, et al., U.S. application Ser. No. 09/022,062, filed on Feb. 11, 1998, now U.S. Pat. No. 6,272,230, issued on Aug. 7, 2001;

"Multiple-Stage Apparatus and Method for Detecting Objects in Computed Tomography Data," invented by Muzaffer Hiraoglu, et al., U.S. application Ser. No. 09/022,164, filed on Feb. 11, 1998, now U.S. Pat. No. 6,035,014, issued on Mar. 7, 2000;

"Apparatus and Method for Detecting Objects in Computed Tomography Data Using Erosion and Dilation of Objects," invented by Sergey Simanovsky, et al., U.S. application Ser. No. 09/022,204, filed on Feb. 11, 1998, now U.S. Pat. No. 6,067,366, issued on May 23, 2000;

"Apparatus and method for processing object data in computed tomography data using object projections," invented by Carl R. Crawford, et al, U.S. application Ser. No. 09/228,379, filed on Jan. 12, 1999, now U.S. Pat. No. 6,345,113, issued on Feb. 5, 2002;

"Apparatus and method for detecting concealed objects in computed tomography data," invented by Sergey Simanovsky, et al., U.S. application Ser. No. 09/228,380, filed on Jan. 12, 1999, now U.S. Pat. No. 6,195,444, issued on Feb. 27, 2001;

"Method of and system for correcting scatter in a computed tomography scanner," invented by Ibrahim M. Bechwati, et al, U.S. application Ser. No. 10/121,466, filed on Apr. 11, 2002, now U.S. Pat. No. 6,687,326, issued on Feb. 3, 2004;

"Method of and system for reducing metal artifacts in images generated by x-ray scanning devices," invented by Ram Naidu, et al, U.S. application Ser. No. 10/171,116, filed on Jun. 13, 2002, now U.S. Pat. No. 6,721,387, issued on Apr. 13, 2004;

"Method and apparatus for automatic image quality assessment," invented by Seemeen Karimi, et al, U.S. application Ser. No. 09/842,075, filed on Apr. 25, 2001.

FIELD OF THE DISCLOSURE

The present disclosure relates to systems for and methods of processing projection data in a computed tomography scanner, and more particularly to a method of and a system for detecting anomalies in projection images generated by computed tomography scanners.

BACKGROUND OF THE DISCLOSURE

Most X-ray baggage scanning systems in use today are of the "line scanner" type and include a stationary X-ray source, a stationary linear detector array, and a conveyor belt for transporting baggage between the source and detector array as the baggage passes through the scanner. The X-ray source generates an X-ray beam that passes through and is partially attenuated by the baggage and is then received by the detector array. During each measuring interval the detector array generates data representative of the integral of density of the planar segment of the baggage through which the X-ray beam passes, and this data is used to form one or more raster lines of a two-dimensional image. As the conveyor belt transports the baggage past the stationary source and detector array, the scanner generates a two-dimensional image representative of the density of the baggage, as viewed by the stationary detector array. The density image is typically displayed for analysis by a human operator.

Detection of suspected baggage containing threat objects or prohibited items requires very attentive operators. The requirement for such attentiveness can result in greater operator fatigue, and fatigue as well as any distractions can result in a suspected bag passing through the system undetected. Accordingly, a great deal of effort has been made to design a better baggage scanner. Such designs, for example, have been described in U.S. Pat. Nos. 4,759,047 (Donges et al.); 4,884,289 (Glockmann et al.); 5,132,988 (Tsutsui et al.); 5,182,764 (Peschmann et al.); 5,247,561 (Kotowski); 5,319,547 (Krug et al.); 5,367,552 (Peschmann et al.); 5,490,218 (Krug et al.) and German Offenlegungsschrift DE 31 503 06 A1 (Heimann GmbH).

At least one of these designs, described in U.S. Pat. Nos. 5,182,764 (Peschmann et al.) and 5,367,552 (Peschmann et al.) (herein after the '764 and '552 patents), has been commercially developed and is referred to hereinafter as the "Invision Machine." The Invision Machine includes a CT scanner of the third generation type, which typically includes an X-ray source and an X-ray detector system secured respectively to diametrically opposite sides of an annular-shaped platform or disk. The disk is rotatably mounted within a gantry support so that in operation the disk continuously rotates about a rotation axis while X-rays pass from the source through an object positioned within the opening of the disk to the detector system.

The detector system can include a linear or two-dimensional array of detectors disposed as a single row or multiple rows in the shape of a circular, cylindrical or spherical arc having a center of curvature at the focal spot of the X-ray source, i.e., the point within the X-ray source from which the X-rays emanate. The X-ray source generates a fan or pyramidal shaped beam, or fan or cone beam, of X-rays that emanates from the focal spot, passes through a planar imaging field, and is received by the detectors. The CT scanner includes a coordinate system defined by X-, Y- and Z-axes, wherein the axes intersect and are all normal to one another at the center of rotation of the disk as the disk rotates about the rotation axis. This center of rotation is commonly referred to as the by and lie within the planar imaging field. The fan beam is thus defined as the volume of space defined between a point source, i.e., the focal spot, and the receiving surfaces of the detectors of the detector array exposed to the X-ray beam. Because the dimension of the receiving surfaces of each of the detectors of the array of detectors is relatively small in the Z-axis direction the beam is designed to be relatively thin in the Z-axis direction. Each detector generates an output signal representative of the intensity of the X-rays incident on that detector. Since the X-rays are partially attenuated by all the mass in their path, the output signal generated by each detector is representative of the density of all the mass disposed in the imaging field between the X-ray source and that detector.

As the disk rotates, the detector array is periodically sampled, and for each measuring interval each of the detectors in the detector array generates an output signal representative of the density of a portion of the object being scanned during that interval. The collection of all of the output signals generated by all the detectors of the detector array for any measuring interval is referred to as a "projection," or equivalently as a "view," and the angular orientation of the disk (and the corresponding angular orientations of the X-ray source and the detector array) during generation of a projection is referred to as the "projection angle." At each projection angle, the path of the X-rays from the focal spot to each detector, called a "ray," increases in cross section from an appropriate point source to the receiving surface area of the detector, and thus is thought to magnify the density measurement because the receiving surface area of the detector area is larger than any cross sectional area of the object through which the ray passes.

As the disk rotates around the object being scanned, the scanner generates a plurality of projections at a corresponding plurality of projection angles. Using well known algorithms a CT image of the object may be generated from all the projection data collected at each of the projection angles. The CT image is representative of the density of a two dimensional "slice" of the object through which the fan beam has passed during the rotation of the disk through the various projection angles. The resolution of the CT image is determined in part by the width of the receiving surface area of each detector in the plane of the beam, the width of the detector being defined herein as the dimension measured in the same direction as the width of the beam, while the length of the detector is defined herein as the dimension measured in a direction normal to the beam parallel to the rotation or Z-axis of the scanner. In general, the resolution of the CT image is inversely proportional to the width of the receiving surface of each detector in the plane of the fan beam.

Referring to the drawings, FIGS. 1, 2 and 3 show perspective, end cross-sectional, and radial cross-sectional views, respectively, of a typical baggage scanning system 100, which includes a conveyor system 110 for continuously conveying baggage or luggage 112 in a direction indicated by arrow 114 through a central aperture of a CT scanning system 120. The conveyor system includes motor driven belts for supporting the baggage. Conveyor system 110 is illustrated as including a plurality of individual conveyor sections 122; however, other forms of conveyor systems may be used.

The CT scanning system 120 includes an annular shaped rotating platform, or disk, 124 disposed within a gantry support 125 for rotation about a rotation axis 127 (shown in FIG. 3) that is preferably parallel to the direction of travel 114 of the baggage 112. Disk 124 is driven about rotation axis 127 by any suitable drive mechanism, such as a belt 116 and motor drive system 118, or other suitable drive mechanism, such as the one described in U.S. Pat. No. 5,473,657 issued Dec. 5, 1995 to Gilbert McKenna, entitled "X-ray Tomographic Scanning System," which is assigned to the present assignee and which is incorporated herein in its entirety by reference. Rotating platform 124 defines a central aperture 126 through which conveyor system 110 transports the baggage 112.

The system 120 includes an X-ray tube 128 and a detector array 130 which are disposed on diametrically opposite sides of the platform 124. The detector array 130 can be a two-dimensional array such as the array described in U.S. Pat. No. 6,091,795 entitled, "Area Detector Array for Computed Tomography Scanning System." The system 120 further includes a data acquisition system (DAS) 134 for receiving and processing signals generated by detector array 130, and an X-ray tube control system 136 for supplying power to, and otherwise controlling the operation of, X-ray tube 128. The system 120 is also preferably provided with a computerized system (not shown) for processing the output of the data acquisition system 134 and for generating the necessary signals for operating and controlling the system 120. The computerized system can also include a monitor for displaying information including generated images. System 120 also includes shields 138, which may be fabricated from lead, for example, for preventing radiation from propagating beyond gantry 125.

The X-ray tube 128 may generate a pyramidally shaped beam, often referred to as a "cone beam," 132 of X-rays that pass through a three dimensional imaging field, through which conveying system 110 transports baggage 112. After passing through the baggage disposed in the imaging field, detector array 130 receives cone beam 132 and generates signals representative of the densities of exposed portions of baggage 112. The beam received by the detectors therefore defines a scanning volume of space. Platform 124 rotates about its rotation axis 127, thereby transporting X-ray source 128 and detector array 130 in circular trajectories about baggage 112 as the conveyor system 110 continuously transports baggage through central aperture 126, so as to generate a plurality of projections at a corresponding plurality of projection angles.

The explosive detection systems used for discrimination of compositions, objects or conditions must provide the same (i.e. consistent and uniform) discrimination results for the same scanned compositions, objects and conditions, so that one set of algorithms and parameters may be used by all of the scanners. This requirement applies to any composition, object or condition that may be scanned. As a result, the images provided by the scanners should be similar enough so that the same discrimination results are obtained.

In order to ensure that a scanner meets specification in terms of its discrimination capabilities and other performance criteria, it is beneficial to test its image quality. The image quality assessment method by Engel et al., entitled "Computerized Tomography Calibrator," U.S. Pat. No. 5,056,130, and a method by Aufrichtig et al., entitled "Apparatus and Methods for Automatic Monitoring and Assessment of Image Quality in X-ray systems," U.S. Pat. No. 5,841,835, represent examples of prior art image quality assessment methods. These methods require precise positioning of a phantom, step-and-shoot scanning, and special, non-normal modes of operation.

In U.S. application Ser. No. 09/842,075, filed on Apr. 25, 2001, by Seemeen Karimi, et al., entitled "Method of and apparatus for automatic image quality assessment," and assigned to the present assignee, 3D CT images of a fixed image quality phantom, which is specially designed, are used to assess the stability of the high voltage power supply that powers the X-ray tube, the X-ray flux, the placement of the conveyor belt relative to the scanner, the speed of the gantry, and the speed of the belt. The method includes comparing the measured object properties including the mean CT numbers and the standard deviation of CT numbers with pre-stored reference values. Tolerances are allowed for the measured mean and standard deviation. The use of the mean and standard deviation coupled with a tolerance can result in a miss-detection of artifacts. For example, a dark streak and a bright streak within an object region can yield the same mean value as a similar object region without streaks, and a standard deviation value which is still within the tolerance range, resulting in a miss-detection of such streaks. Another drawback of the method is that it only computes the properties of the object regions. Thus, artifacts in the non-object regions can not be detected.

SUMMARY OF THE DISCLOSURE

In accordance with one aspect of the present disclosure, a method of detecting anomalies in projection images generated by CT scanners is provided. The method provides a different way than using 3D CT images in assessing the qualities of the images produced by CT scanners. Some of the CT image artifacts caused by the malfunctioning of some components of a CT scanner are difficult to detect in 3D CT images, but are easy to detect in projection images generated by the CT scanner.

In accordance with the present disclosure, one type of anomaly: bright dots or/and dark dots in the projection images caused by intermittent bad detector channels, is preferably described. The method does not require a specific designed image quality phantom or a special operational mode. The method has the advantage that it can be performed at a normal operation mode i.e., scanning checked luggage.

In one embodiment, a projection image is generated for detecting bright or/and dark dots caused by intermittent bad detector channels. In another embodiment, a CFAR (Constant False Alarm Rate) distance map is constructed using the mean and the standard deviation of neighbor pixels, which in the embodiment described are the side pixels of a 5 by 5 square. Other neighbor schemes can also be used.

In accordance with one embodiment of the present disclosure, a ternary-valued preliminary dot map is generated based on the CFAR distance map. Value of "1" means that the corresponding pixel is brighter than its neighbors; and value of "−1" means that the corresponding pixel is darker than its neighbors.

In one embodiment, a bright dot histogram and a dark dot histogram are each then computed based on the preliminary dot map. A bright (dark) dot histogram accumulates bright (dark) dots at a given x coordinate, which are at a fixed number of pixels apart along the z direction. The histogram automatically imposes the spatial constraints of the bright (dark) dots caused by intermittent bad detector channels.

In accordance with one aspect of the disclosure, the detection of the bright or dark dots caused by intermittent bad detector channels is then based on thresholding the generated dot histograms. A bright (dark) dot is detected if the entry of the dot histogram exceeds a pre-determined threshold. The detected bright or/and dark dots indicate the intermittent malfunctioning of detector channels. The location of the detected bright and dark dots can be used to compute the locations of and therefore identify the intermittent bad detector channels in the detector array.

While this disclosure has been particularly shown and described with references to preferred embodiments thereof, it will be understood by those skilled in the art that various changes in form and details may be made therein without departing from the spirit and scope of the disclosure as defined by the following claims.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE PREFERRED EMBODIMENTS

In accordance with the present disclosure, a preferred algorithm for detecting anomalies in projection images generated by CT scanners is provided. The CT scanners produce 3D CT images, which may have different artifacts due to the malfunctioning of some components of the CT scanners. Some of the artifacts can be automatically detected in the 3D CT images; however some of them are very difficult to detect in 3D CT images. For example, streaks caused by intermittent bad detector channels are very difficult to detect in the 3D CT image, but these streak artifacts appear as bright or/and dark dots and are much easier to detect in projection images that can be generated by the CT scanners. This is in part because the contrast of the streaks is less than the contrast of the dots due to many interpolations in the reconstruction process. Therefore it is one of the objectives of the present disclosure to provide a different way than using 3D CT images for assessing the quality of 3D CT images using projection images generated by the CT scanners.

In the preferred embodiment of the present disclosure, a method for detecting dots caused by intermittent bad detector channels in the projection images generated by CT scanners is preferably described. The method does not require a specific designed image quality phantom or a special operational mode. The method can be performed at a normal operation mode i.e., scanning checked luggage, and thus requiring no down time for the scanner. The method preferably comprises:

Generating projection images;

Computing a CFAR (Constant False Alarm Rate) distance map;

Generating a preliminary dot map;

Generating bright and dark dot histograms; and

Detecting dots from the generated dot histograms.

Figure 4:
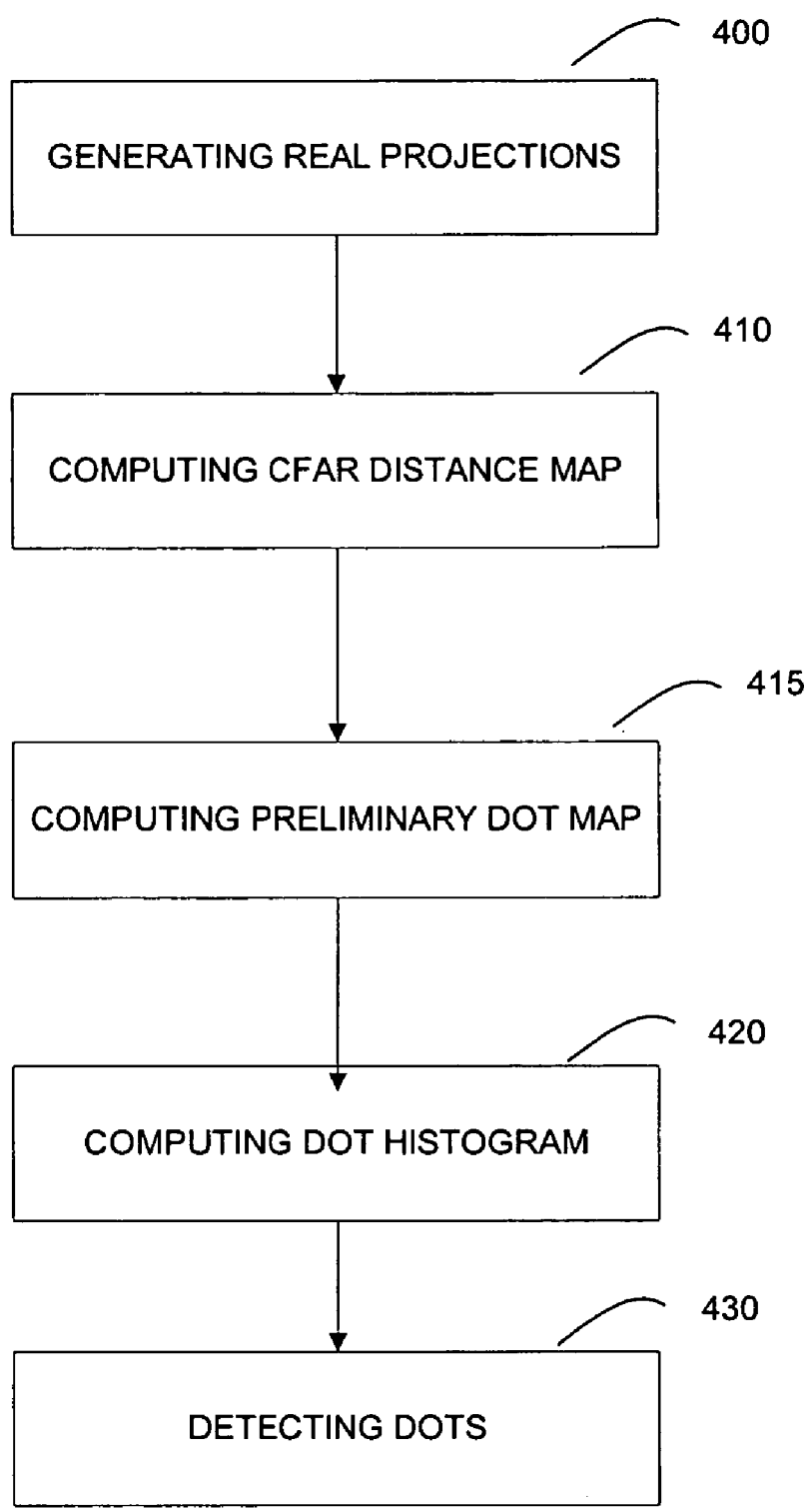
FIG. 4 contains a top-level flow diagram which illustrates the logical flow of one embodiment of detecting dots in projection images in accordance with the present disclosure.

FIG. 4 contains the flow chart of the preferred method in accordance with present disclosure, and is used preferably to describe the details of the method. At Step 400, a projection image from a CT scanner is generated. The methods described in the assignee's U.S. Pat. No. 5,887,047 (Bailey et al.) and U.S. Pat. No. 5,796,802 (Gordon), assigned to the present assignee and incorporated herein by reference, is preferably used to generate a projection image corresponding to a selected angle, for example, 0°. The projection image is similar to what would be obtained if a region were to be scanned by the source and detector, with the source and detector at infinite distance and rotationally stationary while translated along the longitudinal (z) axis of the region. This is also similar to the image obtained by a stationary X-ray line scanner which obtains image data from only a single angle through the region being scanned.

The generated projection image is denoted as P(x, z), $x=0, \ldots, X-1, z=0, \ldots, Z-1$, where X is related to the number of detectors in each row of the two-dimensional detector array, and Z is proportional to the length of the scanned region.

Figure 5:
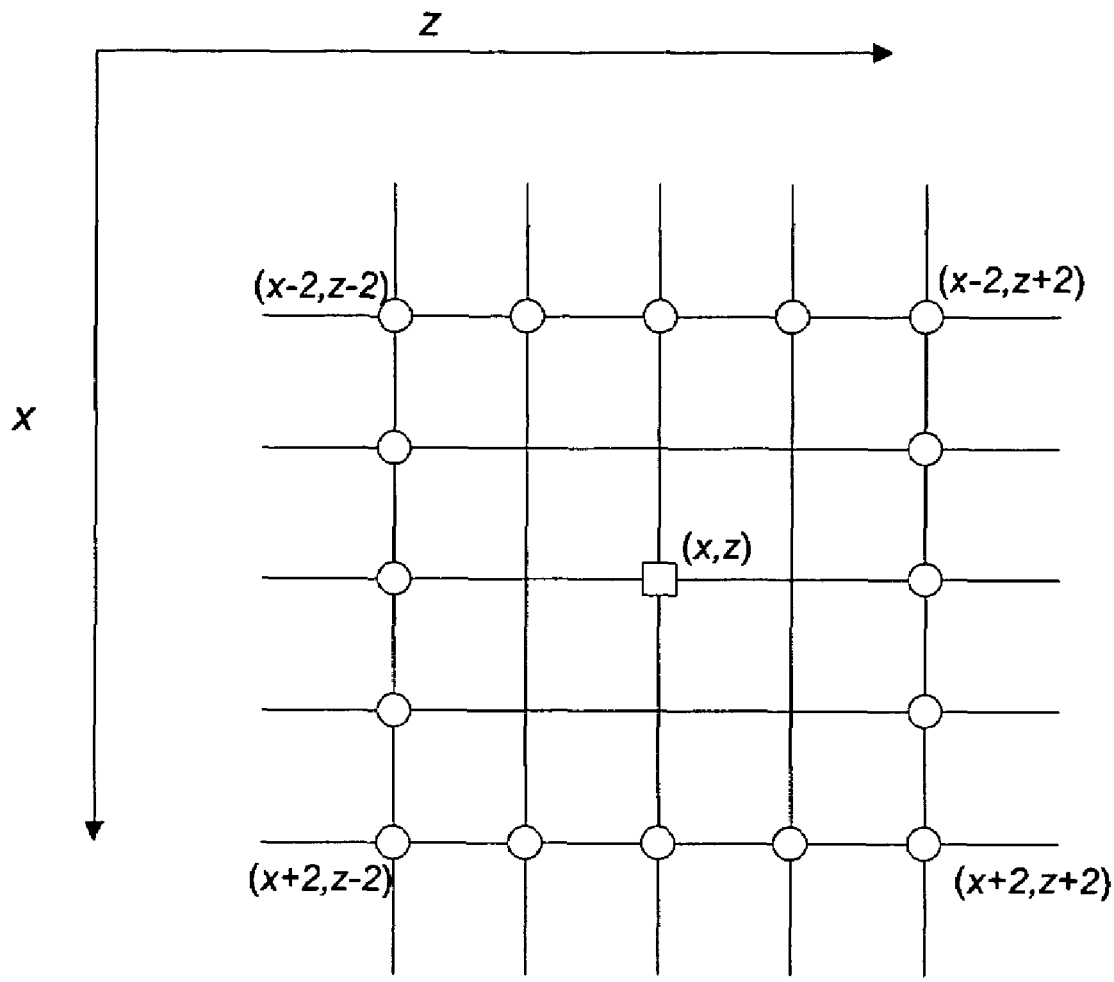
FIG. 5 illustrates a neighbor scheme used in computing a CFAR distance map of the present disclosure.

Next at Step 410, a CFAR (Constant False Alarm Rate) distance map is constructed to detect pixels (or dots) within the projection images, which are statistically different from their neighboring pixels. For each pixel (x, z) in the projection image, a neighbor pixel set N(x, z) is illustrated in FIG. 5, and is mathematically defined as follows, $$N(x, z) = \{(x', z'): |x'-x|=2, |y'-y| \leq 2, \text{ or } |y'-y|=2, |x'-x| \leq 2\}$$

Note that the neighbor pixels are the side pixels of a 5 by 5 square, centered at pixel (x, z), and there are total of 16 neighbor pixels. Thus, "side" pixels are those pixels along the top, bottom and side edges of the 5 by 5 square array.

Still at Step 410, a mean of the neighbor pixels is computed as follows, $$M(x, z) = \frac{1}{16} \sum_{(x', z') \in N(x,z)} P(x', z')$$

then a standard deviation is computed as follows, $$S(x, z) = \sqrt{\frac{1}{16} \sum_{(x', z') \in N(x,z)} [P(x', z') - M(x, z)]^2}$$

Finally, the CFAR distance map D(x, z) is computed as follows, $$D(x, z) = \frac{P(x, z) - M(x, z)}{S(x, z)}$$

The CFAR distance map describes how different each pixel is from its neighbor pixels. Note that in computing the CFAR distance map, a border replication scheme is preferably used for dealing with boundary conditions, for example, $P(x,z) = P(0,z)$ for $x < 0$, $P(x,z) = P(X-1,z)$ for $x \geq X$ The above rule applies to the z index as well.

Figure 1:
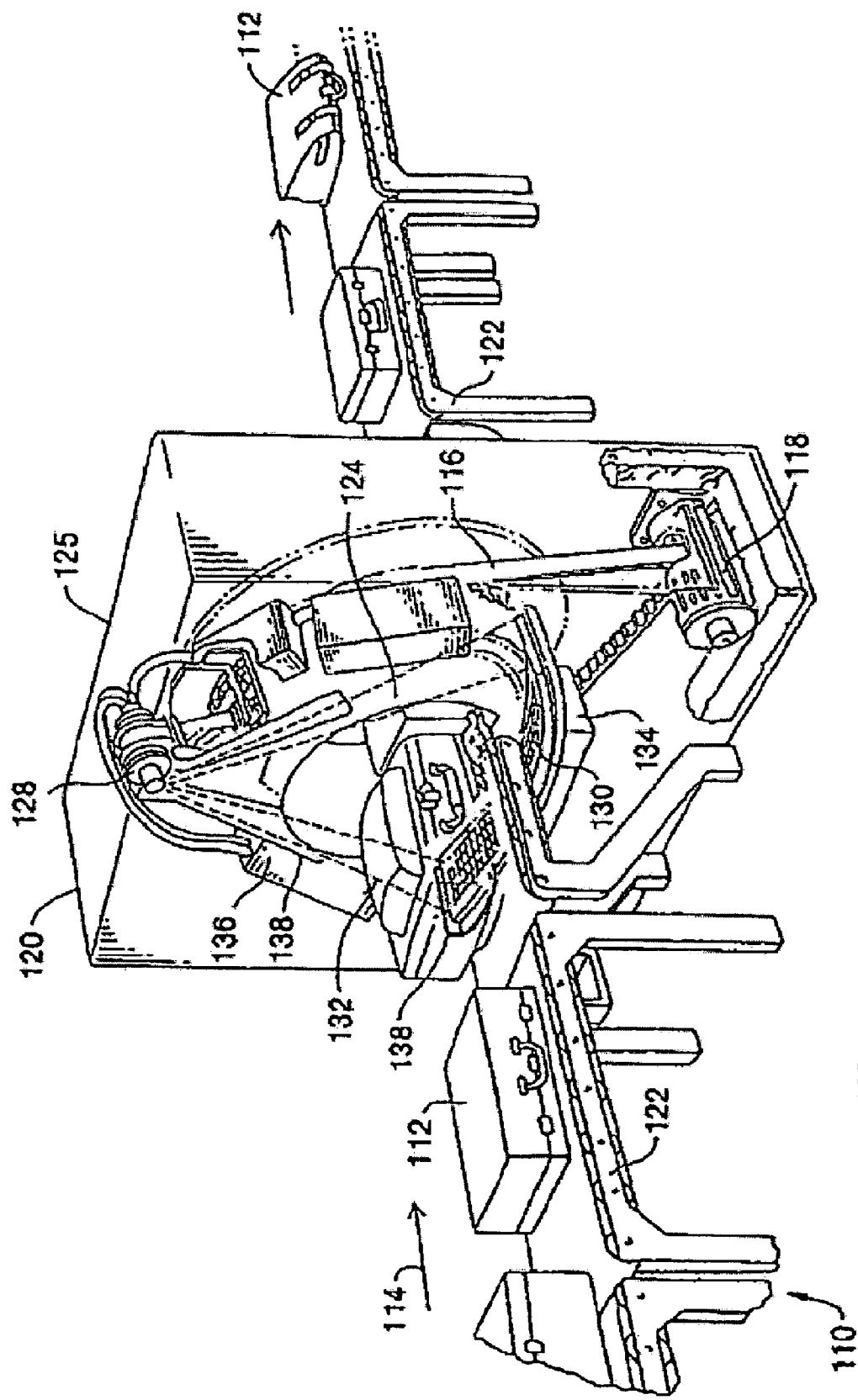
FIG. 1 is a perspective view of a baggage scanning system, of the type which can incorporate the teachings of the present disclosure.
Figure 2:
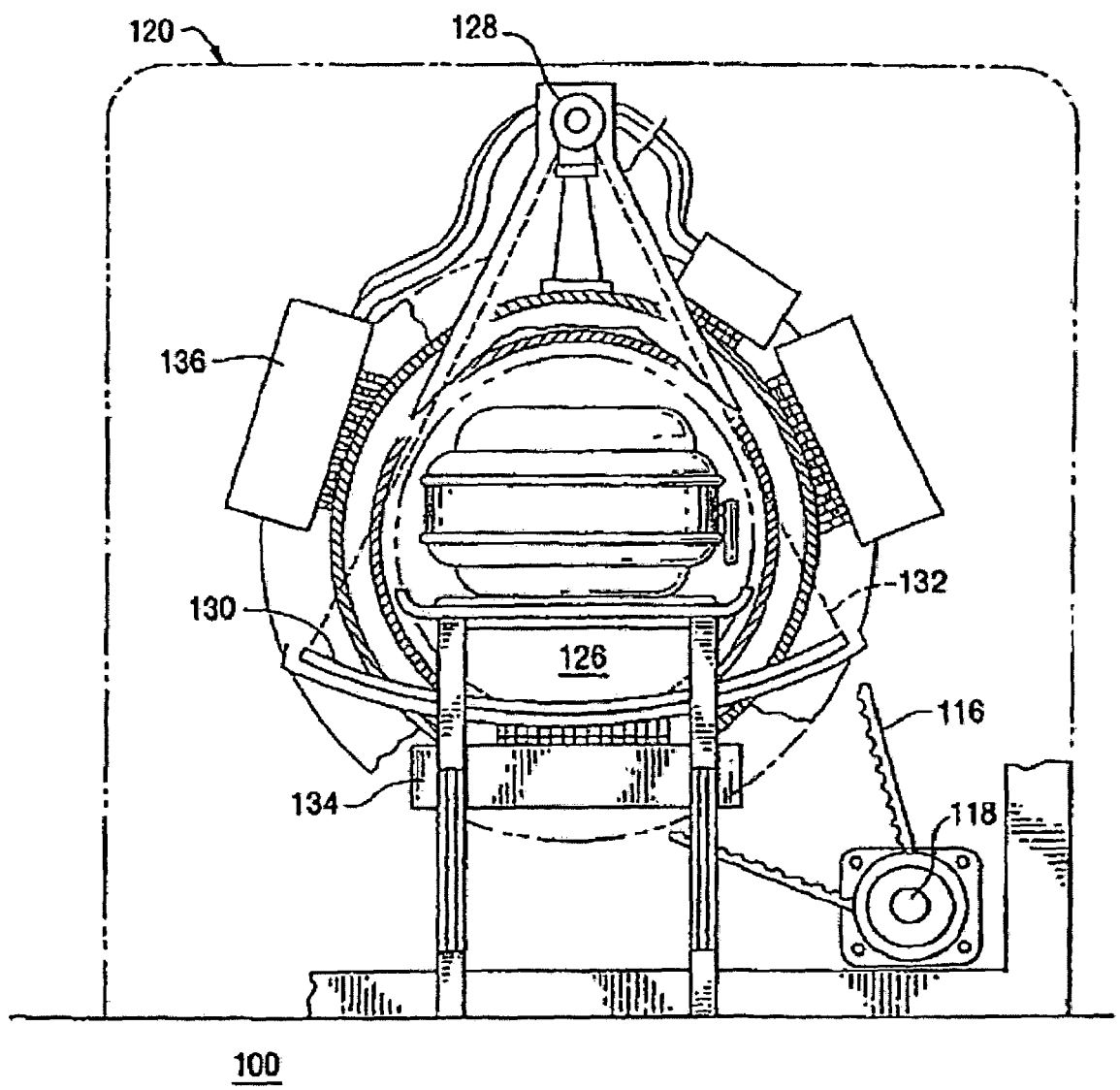
FIG. 2 is a cross-sectional end view of the system of FIG. 1.
Figure 3:
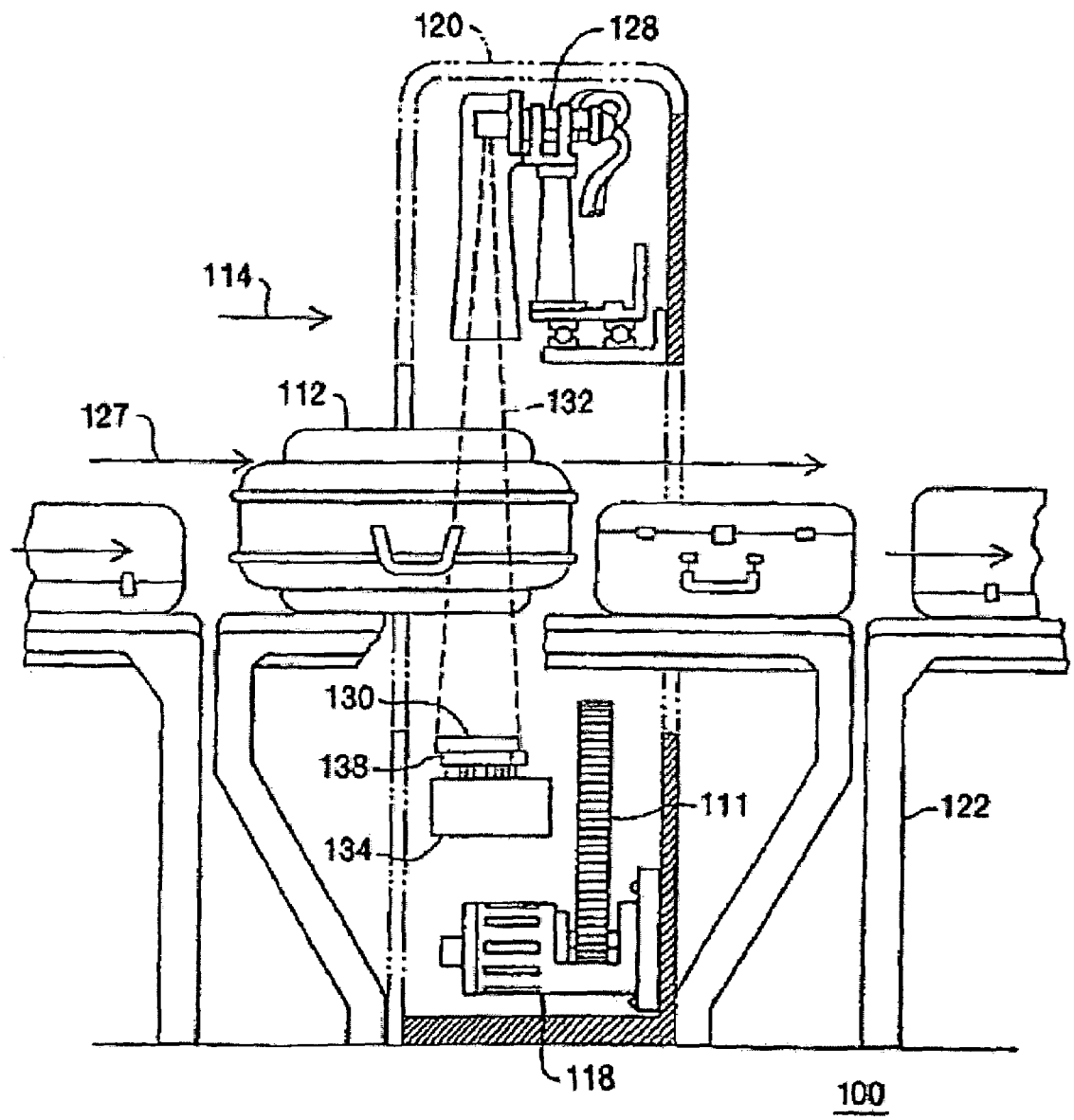
FIG. 3 is a cross-sectional radial view of the system of FIG. 1.

In Step 415, a preliminary dot map is computed based on thresholding the CFAR distance map as follows, $$Q(x, z) = \begin{cases} 1, & D(x, z) \geq T \\ 0, & -T < D(x, z) < T \\ -1, & D(x, z) \leq -T \end{cases}$$

where T is pre-determined threshold. The value of T is experimentally determined, for example, T=8 yields satisfactory results in the assignee's system in connection with the scanners shown in FIGS. 1-3. Each entry of the preliminary dot map is ternary-valued. Value of "1" means that the corresponding pixel is brighter than its neighbors; and value of "−1" means that the corresponding pixel is darker than its neighbors.

An intermittent bad detector channel generates either bright dots or dark dots in the projection images. The bright dots (or dark dots) generated by an intermittent bad detector channel has a spatial correlation along the z coordinate of the projection image at a given x coordinate. They show up in the multiples of the z distance, denoted as $d_z$, corresponding to one disk rotation of the scanner. In the assignee's scanner system in connection with FIGS. 1-3, the z distance $d_z$ corresponding to one disk rotation is 30 pixels.

In order to detect the bright dots (or dark dots) with such spatial structures, a bright dot histogram $H_b(x, z)$ and a dark dot histogram $H_d(x, z)$, x=0, ..., X−1, z=0, ..., $d_z$−1, are each created in Step 420. The dot histograms have the dimension of X by $d_z$ entries. Each entry of the histogram holds the number of bright (or dark) dots which appear every $d_z$ pixels along the z axis. These two histograms are computed as follows, $$H_b(x, z) = \sum_{z' = z + k d_z, z' \leq Z-1, Q(x,z) > 0} Q(x, z) \quad (a)$$

$$H_d(x, z) = \sum_{z' = z + k d_z, z' \leq Z-1, Q(x,z) < 0} -Q(x, z) \quad (b)$$

where k is nonnegative integer. The use of the histogram for accumulating a preliminary dot map imposes a spatial constraint for detecting the bright or/and dark dots caused by intermittent bad detector channels, therefore eliminating the detection of random bright or/and dark dots, which are the actual contents of scanned luggage.

In Step 430, the bright dots or dark dots are detected based on the two histograms. If any entry in bright dot histogram exceeds a pre-determined threshold N, a bright dot is detected at that entry. Similarly a dark dot is detected at the entry whose value exceeds the pre-determined threshold N. The value of N is experimentally determined, for example, N=3 yields satisfactory results in the assignee's system in connection with the scanners shown in FIGS. 1-3. Note that the above described algorithm for detecting the bright (or dark) dots caused by intermittent bad detector channels requires that the z dimension of the input projection images is greater than $Nd_z$, i.e., at least 90 pixels along z axis for the values described in the present disclosure. Note that the above detection of the bright or/and dark dots does not require the dots appear in a consecutive manner but in every $d_z$ pixels along the z coordinate, i.e., in both Eqs. (a) and (b), the integers k is not required to be consecutive.

The locations of the detected bright (or dark) dots in the projection images can be used to compute the locations of the corresponding intermittent bad detector channel in the detector array of the scanner.

While this disclosure has been particularly shown and described with references to preferred embodiments thereof, it will be understood by those skilled in the art that various changes in form and details may be made therein without departing from the spirit and scope of the disclosure as defined by the following claims. Such variations include using different sets of neighbor pixels in generating the CFAR distance map.

The invention claimed is:

1. A method of detecting bad detector channels of a detector array mounted on a rotating gantry of a computed tomography (CT) scanner comprising:
   A. Generating two-dimensional projection images using said CT scanner, wherein said two-dimensional projection images are generated during a normal operating mode of said CT scanner without using an image quality phantom;
      wherein said two dimensions include the transportation direction of a scanned object (Z-axis);
   B. Calculating a two-dimensional constant false alarm rate (CFAR) distance map using said two-dimensional projection images generated from said CT scanner;
   C. Generating a two-dimensional ternary-valued preliminary dot map from said CFAR distance map by comparing said CFAR distance map with a pre-defined threshold and with the negative of said pre-defined threshold;

D. Generating a two-dimensional dot histogram using said ternary-valued preliminary dot map: wherein the size of one of said two dimensions is the transportation distance along the Z-axis corresponding to one gantry rotation; and E. Detecting bad detector channels by comparing said two-dimensional dot histogram with a pre-defined threshold and by using the locations of those dots beyond said pre-defined threshold.

2. A system for detecting bad detector channels of a detector array mounted on a rotating gantry of a computed tomography (CT) scanner comprising:

A. A component constructed and arranged so as to generate projection images using said CT scanner, wherein said two-dimensional projection images are generated during a normal operating mode of said CT scanner without using an image quality phantom; wherein said two dimensions include the transportation direction of a scanned object (Z-axis);

B. A component constructed and arranged so as to calculate a two-dimensional constant false alarm rate (CFAR) distance map using said two-dimensional projection images generated from said CT scanner;

C. A component constructed and arranged so as to generate a two-dimensional ternary-valued preliminary dot map from said CFAR distance map by comparing said CFAR distance map with a pre-defined threshold and with the negative of said pre-defined threshold;

D. A component constructed and arranged so as to generate a two-dimensional dot histogram using said ternary-valued preliminary dot map: wherein the size of one of said two dimensions is the transportation distance along the Z-axis corresponding to one gantry rotation; and E. A component constructed and arranged so as to detect bad detector channels by comparing said two-dimensional dot histogram with a pre-defined threshold and by using the locations of those dots beyond said pre-defined threshold.

* * * * *